United States Patent [19]

Yamaguchi

[11] Patent Number: 5,216,565
[45] Date of Patent: Jun. 1, 1993

[54] TAPE CASSETTE HAVING PIVOTALLY MOUNTED TAPE REELS AND ASSOCIATED REEL RETAINERS

[75] Inventor: Masato Yamaguchi, Kanagawa, Japan

[73] Assignee: Sony Corporation, Tokyo, Japan

[21] Appl. No.: 793,133

[22] Filed: Nov. 18, 1991

[30] Foreign Application Priority Data

Nov. 22, 1990 [JP] Japan .................. 2-319463

[51] Int. Cl.⁵ ............................ G11B 23/02
[52] U.S. Cl. ...................... 360/132; 360/85
[58] Field of Search ............ 360/132, 85; 242/197, 242/199

[56] References Cited

U.S. PATENT DOCUMENTS

| | | | |
|---|---|---|---|
| 4,807,077 | 2/1989 | Zaitsu et al. | 360/132 |
| 4,901,171 | 2/1990 | Urayama et al. | 360/132 X |
| 4,903,915 | 2/1990 | Iwahashi | 360/132 X |
| 4,956,732 | 9/1990 | Moriyama | 360/85 |

Primary Examiner—John H. Wolff
Attorney, Agent, or Firm—Lewis H. Eslinger; Jay H. Maioli

[57] ABSTRACT

A tape cassette including a cassette case; a pair of rotatable tape reels accommodated in the cassette case for winding a magnetic tape therearound; a mouth section formed between and front of the tape reels in the cassette case for receiving a head drum and the like of a recording/reproducing device; a mechanism for allowing pivotal movement of the tape reels to rear corner portions of the cassette, whereby when the tape cassette is loaded into the recording/reproducing device, the tape reels are pivotally moved from an initial position to a retracted position defined at the rear corner portions of the cassette case, thereby expanding the mouth section; and a pair of reel retainers pivotably supported in the cassette case for rotatably supporting the tape reels, respectively, each of the reel retainers having a bottom wall formed with a positioning hole adapted to engage a positioning member provided in the recording/reproducing device. Accordingly, the positions of the tape reels can be stabilized during operation.

4 Claims, 10 Drawing Sheets

TAPE CASSETTE HAVING PIVOTALLY MOUNTED TAPE REELS AND ASSOCIATED REEL RETAINERS

BACKGROUND OF THE INVENTION

The present invention relates to a tape cassette for use with a recording/reproducing device, and more particularly to such a tape cassette including a cassette case, a pair of rotatable tape reels accommodated in the cassette case for winding a magnetic tape therearound, a mouth section formed between and along the front of the tape reels in the cassette case for receiving a head drum and the like of a recording/reproducing device, and means for allowing pivotal movement of the tape reels to rear corner portions of the cassette, whereby when the tape cassette is loaded into the recording/reproducing device, the tape reels are pivotally moved from an initial position to a retracted position defined at the rear corner portions of the cassette case, thereby expanding the mouth section.

It has been proposed that a pair of tape reels are rotatably accommodated in a cassette case having the same external form as that of a standard tape cassette conventionally standardized so that the tape reels can be pivotally moved between an initial position allowing the compatibility with the standard tape cassette and a retracted position where the tape reels are retracted to rear corner portions of the cassette case for the purpose of adaptation to a dedicated recording/reproducing device. When the tape reels are moved to the retracted position, a mouth section defined between and front of the tape reels can be expanded to allow a head drum and the like to be deeply inserted into the expanded mouth section. Accordingly, the recording/reproducing device dedicated for such a tape cassette can be made compact. Further, the tape cassette can also be applied to another type recording/reproducing device employing a standard tape cassette by restoring the initial position of the tape reels.

However, in such a tape cassette including the movable tape reels, there is a problem such that the positions of the tape reels during the operation are not stabilized because of the fact that the tape reels are movable, causing the generation of vibration or a force providing a deviated side pressure to reel engagement shafts engaging the tape reels, thus hindering stable running of a tape. In particular, in the case where the tape cassette is provided with biasing means for returning the tape reels to the initial position, a return force of the biasing means to restore the initial position is always applied to the tape reels irrespective of the operational condition of the tape cassette. Accordingly, the return force applied to the tape reels undesirably provides a deviated side pressure to the reel engagement shafts.

SUMMARY OF THE INVENTION

It is accordingly an object of the present invention to provide a tape cassette which can stabilize the positions of the tape reels during the operation in a recording/reproducing device.

According to the present invention, there is provided a tape cassette comprising a cassette case; a pair of rotatable tape reels accommodated in said cassette case for winding a magnetic tape therearound; a mouth section formed between and along the front of said tape reels in said cassette case for receiving a head drum and the like of a recording/reproducing device; means for allowing pivotal movement of said tape reels to rear corner portions of said cassette, whereby when said tape cassette is loaded into said recording/reproducing device, said tape reels are pivotally moved from an initial position to a retracted position defined at the rear corner portions of said cassette case, thereby expanding said mouth section; and a pair of reel retainers pivotably supported in said cassette case for rotatably supporting said tape reels, respectively, each of said reel retainers having a bottom wall formed with a positioning hole adapted to engage a positioning member provided in said recording/reproducing device.

With this arrangement, when the tape cassette is loaded into the recording/reproducing device, the positioning members of the recording/reproducing device are brought into engagement with the positioning holes of the reel retainers in the tape cassette, thereby stabilizing the positions of the reel retainers relative to the recording/reproducing device. Accordingly, the tape reels supported by the reel retainers can be stabilized in position during the operation. Thus, the operational positions of the tape reels can be stabilized in spite of the structure that the tape reels are pivotally movable with the reel retainers. As a result, it is possible to provide that no undue force or vibration is applied to the reel engagement shafts adapted to engage the tape reels and drive same during the operation, thus ensuring stable running of the tape.

Other objects and features of the invention will be more fully understood from the following detailed description and appended claims when taken with the accompanying drawings.

DETAILED DESCRIPTION OF THE PREFERRED EMBODIMENTS

There will now be described a preferred embodiment of the present invention with reference to the drawings.

Referring to FIGS. 1 to 9D, reference numeral 1 generally designates a tape cassette according to the preferred embodiment, and reference numeral 2 designates a cassette case of the tape cassette 1. The cassette case 2 is made of a synthetic resin, and it is constructed of an upper half 3 and a lower half 4 combined together by means of screws or the like.

An external shape, size, etc. of the cassette case 2 are in accordance with an 8 mm video standard which is a world unified standard.

A pair of tape reels 6 and 7 each winding a magnetic tape 5 therearound are rotatably accommodated in the cassette case 2.

Two tape outlets 8 and 9 are formed at left and right ends of a front surface of the cassette case 2, and two guide rollers 10a and 10b are rotatably provided at the two tape outlets 8 and 9 on the laterally inner sides thereof, respectively. The magnetic tape 4 wound around the tape reels 6 and 7 are led out therefrom and guided by the guide rollers 10a and 10b to come out of the cassette case 2 through the tape outlets 8 and 9. Thus, the magnetic tape 5 is partially disposed along the front surface of the cassette case 2 as stretched between the two guide rollers 10a and 10b.

The tape reels 6 and 7 are comprised of hubs 6a and 7a around which the magnetic tape 5 is wound, upper flanges 11a and 11b and lower flanges 12a and 12b for defining upper and lower wound surfaces of the magnetic tape 5, respectively. Bottom surfaces of the tape reels 6 and 7 are formed at central portions thereof with open holes 6b and 7b, respectively. Diameters of the upper and lower flanges 11a and 12a of the tape reel 6 and diameters of the upper and lower flanges 11b and 12b of the tape reel 7 are smaller than those of a standard tape cassette. Accordingly, a length of the magnetic tape 5 to be wound around the tape reels 6 and 7 is smaller than that in the standard tape cassette (i.e., a recordable or reproducible time of the magnetic tape 5 is about 30-60 minutes, for example, in this preferred embodiment).

The tape reels 6 and 7 are movable in the cassette case 2 between an initial or normal position specified by the 8 mm video standard and a retracted position defined at rear corner portions of the cassette case 2.

A moving mechanism for the tape reels 6 and 7 is constructed as follows:

A bottom wall of the lower half 4 is formed with a cutout 13 largely expanding rearwardly from the front opening of the cassette case 2 where the magnetic tape 5 is stretched between the guide rollers 10a and 10b. A pair of reel retainers 14 and 15 for respectively rotatably supporting the tape reels 6 and 7 are provided in the cassette case 2 so as to be disposed over the cutout 13. The reel retainers 14 and 15 are swingably supported to a pair of pivotal shafts 2a at left and right end portions in the cassette case 2, respectively, so that the reel retainers 14 and 15 can swing about the pivotal shafts 2a in front and rear directions of the cassette case 2. The reel retainers 14 and 15 comprised of bottom wall portions 14a and 15a on which the tape reels 6 and 7 are placed, and standing wall portions 14b and 15b so formed as to surround front to inner sides of the tape reels 6 and 7, respectively. Each of the reel retainers 14 and 15 is integrally formed of a synthetic resin. The bottom wall portions 14a and 15a are formed with reel retaining holes 14c and 15c, respectively. On the bottom surfaces of the tape reels 6 and 7, there are formed annular projections 6c and 7c around opening edges of the open holes 6b and 7b, respectively. The annular projections 6c and 7c of the tape reels 6 and 7 are loosely engaged with the reel retaining holes 14c and 15c of the reel retainers 14 and 15, respectively.

A mouth section 16 for receiving a head drum and the like (to be hereinafter described) in recording or reproducing the magnetic tape 5 is formed by an intermediate space defined between the standing wall portions 14b and 15b of the reel retainers 14 and 15 and by a recessed space defined before the intermediate space. A size of the mouth section 16 is made variable by swinging the reel retainers 14 and 15 and accordingly moving the tape reels 6 and 7 together with the reel retainers 14 and 15.

The bottom wall of the lower half 4 is further formed with a pair of recesses 13a and 13b continued from the left and right rear ends of the cutout 13 so as to correspond to the reel retaining holes 14c and 15c of the reel retainers 14 and 15 and trace a locus of swing motion of the reel retainers 14 and 15, respectively.

The bottom wall portions 14a and 15a of the reel retainers 14 and 15 are partially exposed from the cutout 13 of the lower half 4 to a bottom outer surface of the lower half 4, and such exposed surfaces of the bottom wall portions 14a and 15a are utilized as a reference surface for positioning upon loading the tape cassette 2 into a recording/reproducing device. Therefore, a part of the bottom wall portions 14a and 15a not interfering with the lower half 4 upon swinging the reel retainers 14 and 15 (i.e., a hatched part shown in FIG. 6) is formed as a projected flat surface flush with the bottom outer surface of the lower half 4.

A pair of guide rollers 17a and 17b are rotatably mounted on the pivotal shafts 2a as the centers of swing motion of the reel retainers 14 and 15, respectively. The magnetic tape 5 wound around the tape reels 6 and 7 is guided through the guide rollers 17a and 17b to the front guide rollers 10a and 10b, and is exposed to the front opening of the cassette case 2.

Further, a pair of detection holes 18a are formed through opposite side walls of the lower half 4, and a pair of detection holes 18b are also formed through the standing wall portions 14b and 15b of the reel retainers 14 and 15. These detection holes 18a and 18b serve to allow passage of a detection light for detecting top/end of the magnetic tape 5.

A pair of reel presser springs 19 each formed as a leaf spring are mounted on a back surface of the top wall of the upper half 3 at two positions corresponding to the tape reels 6 and 7, respectively. The reel presser springs 19 are comprised of arm portions 19a fixed at their base ends to the upper half 3 and presser portions 19b continued from front ends of the arm portions 19a for resiliently pressing central projections 6d and 7d formed at the centers of the upper surface of the hubs 6a and 7a of the tape reels 6 and 7, respectively. The presser portions 19b have an arcuate shape tracing a locus of movement of the tape reels 6 and 7 to be moved by the reel retainers 14 and 15.

The standing wall portions 14b and 15b of the reel retainers 14 and 15 are formed with spring hook portions 14d and 15d, respectively. The spring hook portions 14d and 15d are located at upper positions on the outside surface of the standing wall portions 14b and 15b generally in the vicinity of rotative rear ends of the reel retainers 14 and 15. A tension coil spring 20 is hooked at its opposite ends to the spring hook portions 14d and 15d under tension, so that a tensile force of the tension coil spring 20 provides for a torque in such a direction that the rotative rear ends of the reel retainers 14 and 15 approach each other, that is, the reel retainers 14 and 15 restore the initial or normal position. Accordingly, when the tape cassette 1 is unloaded from a dedicated recording/reproducing device to remove a force having urged the reel retainers 14 and 15 to the retracted position, the reel retainers 14 and 15 are rotated by the tensile force of the tension coil spring 20 so that the rotative rear ends of the reel retainers 14 and 15 approach each other until the initial position of the tape reels 6 and 7 is restored. With this construction, it is possible to prevent that the tape cassette 1 is erroneously loaded into a recording/reproducing device for a standard tape cassette under the condition where the tape reels 6 and 7 remain in the retracted position.

Further, the bottom wall portions 14a and 15a of the reel retainers 14 and 15 are formed with tab portions 14E and 15E having positioning holes 14e and 15e, respectively. The tab portions 14E and 15E are located at positions remote from the respective pivotal shafts 2a before the spring hook portions 14d and 15d so as to project outwardly in opposed relationship to each other. Each of the positioning holes 14e and 15e of the tab portions 14E and 15E are formed as an elongated hole extending in a radial direction in respect of an arc to be formed about the corresponding pivotal shaft 2a as a fulcrum. The locations of the tab portions 14E and 15E are such that they are not concealed by the bottom wall of the lower half 4 not only in the initial position of the tape reels 6 and 7 but also in the retracted position thereof.

A lock mechanism 21 for locking the tape reels 6 and 7 and the reel retainers 14 and 15 is provided at a rear central portion in the cassette case 2.

The lock mechanism 21 is constructed as follows:

A guide portion 22 is formed at a rear central portion of the lower half 4, and a lock member 23 is provided at the rear central portion of the cassette case 2 so as to be movable along the guide portion 22 in the front and rear directions of the cassette case 2. The lock member 23 is formed at its left and right ends with a pair of pawls 24a and 24b projecting frontward.

Figure 4:
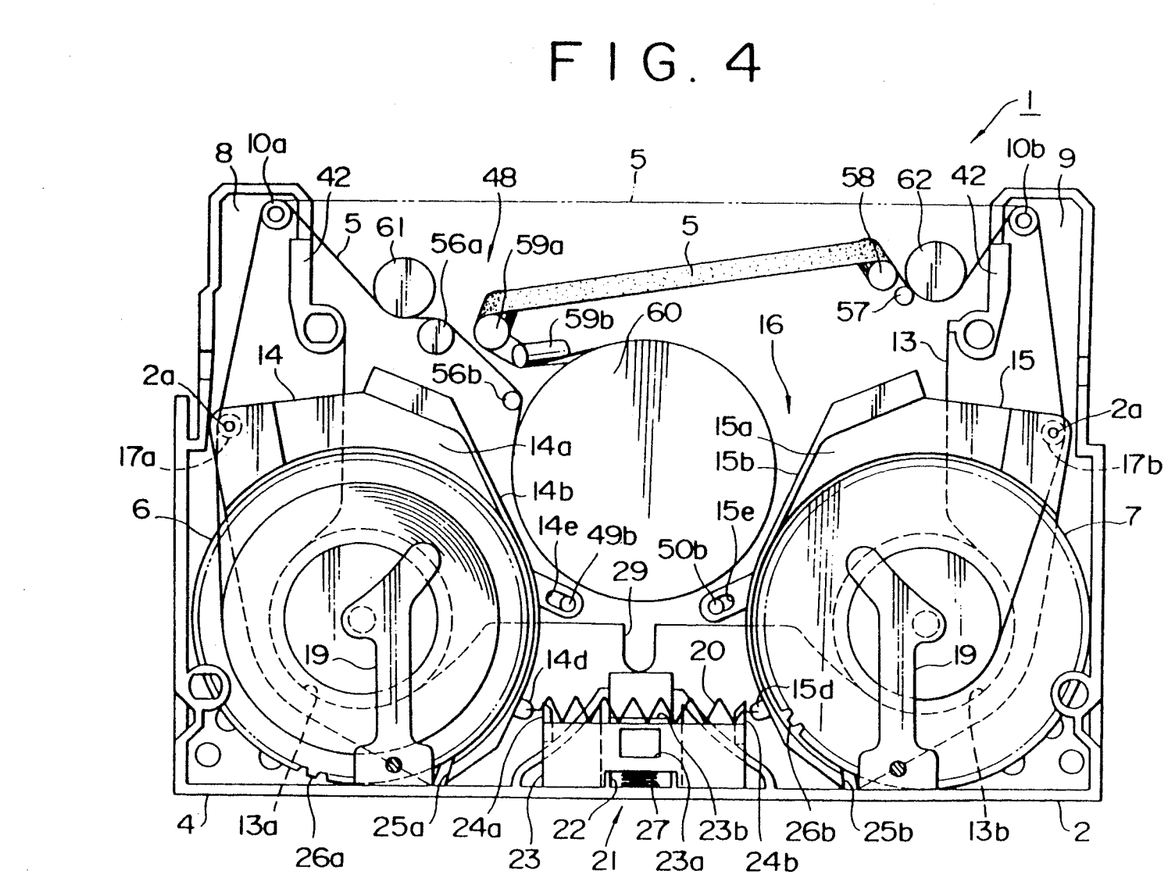
FIG. 4 is a view similar to FIG. 1, showing an expanded condition of the mouth section after ending of a loading operation.
Figure 5:
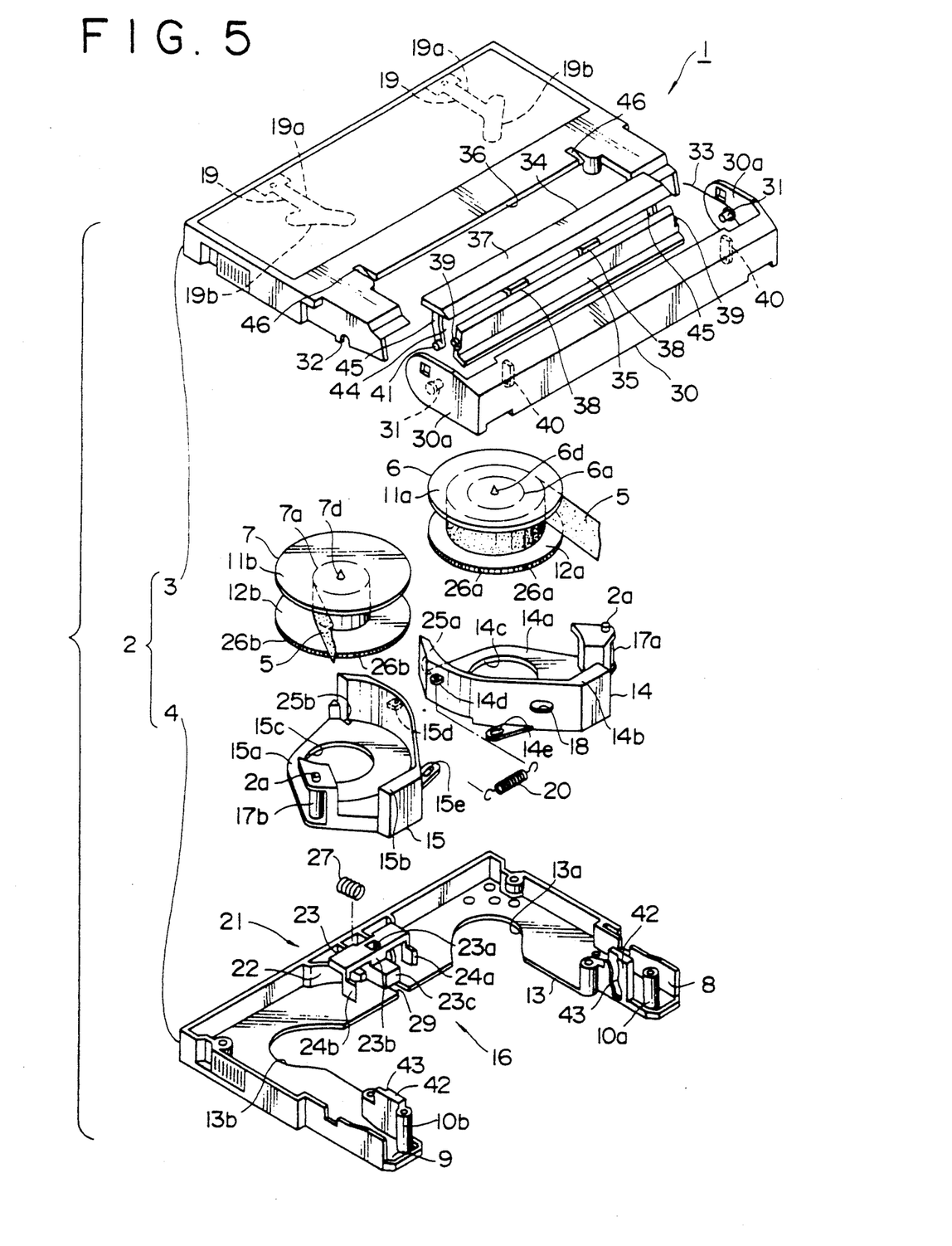
FIG. 5 is an exploded perspective view of the tape cassette.
Figure 6:
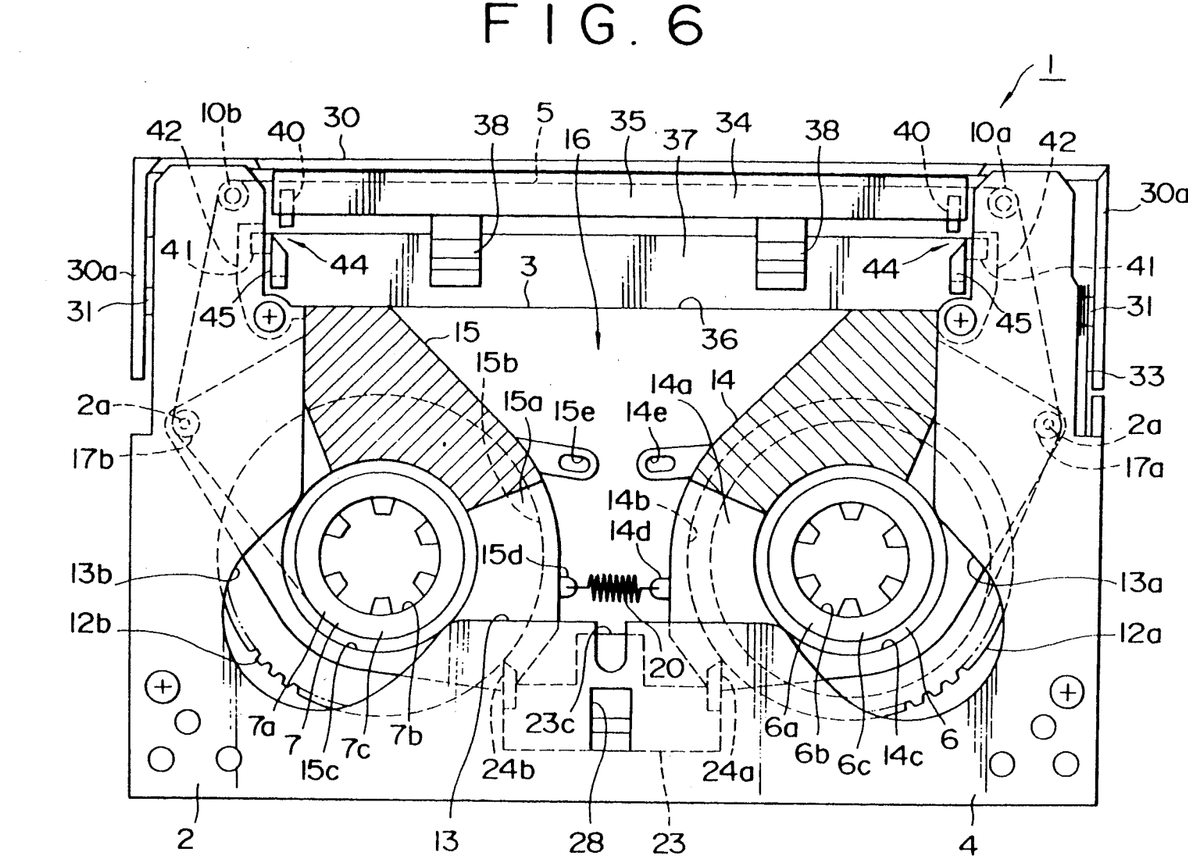
FIG. 6 is a bottom plan view of the tape cassette under the same condition as of FIG. 1.
Figure 7:
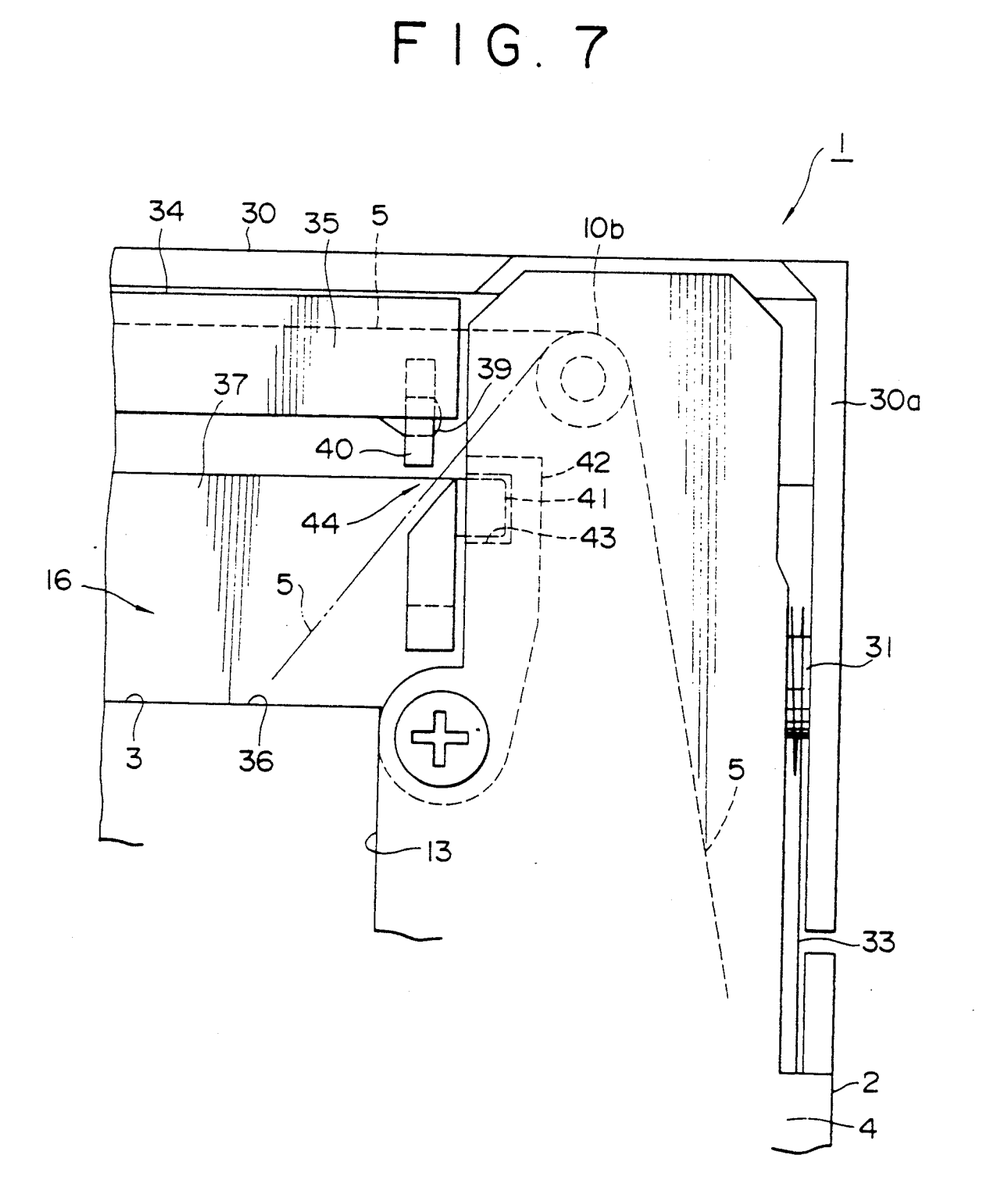
FIG. 7 is an enlarged view of an essential part shown in FIG. 6.
Figure 8:
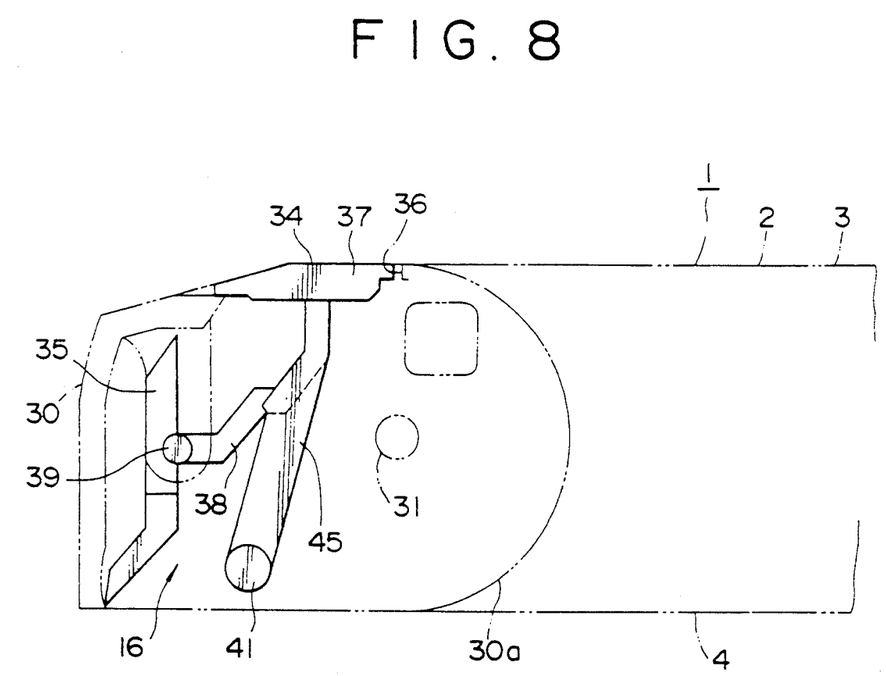
FIG. 8 is an enlarged side view of a back lid shown in FIG. 7.

The lock member 23 is formed at its front half portion with an upper recess 23b, so as to avoid interference with the tension coil spring 20 (see FIG. 4).

The bottom wall portions 14a and 15a of the reel retainers 14 and 15 are recessed at their rear ends to form a pair of engagement grooves 25a and 25b adapted to engage the pawls 24a and 24b, respectively. Furthermore, the lower flanges 12a and 12b of the tape reels 6 and 7 are formed at their entire outer circumferences with a plurality of engagement teeth 26a and 26b adapted to engage the pawls 24a and 24b, respectively.

A compression coil spring 27 is interposed between the lock member 23 and a rear side wall of the lower half 4. Accordingly, the lock member 23 is normally biased by a biasing force of the compression coil spring 27 in the frontward direction such that the pawls 24a and 24b engage both the engagement grooves 25a and 25b of the reel retainers 14 and 15 and the engagement teeth 26a and 26b of the tape reels 6 and 7, respectively.

The lock member 23 is formed at its central portion with an operation hole 23a, while the bottom wall of the lower half 4 is formed with a through hole 28 directly communicating with the operation hole 23a. Accordingly, when the tape cassette 1 in this preferred embodiment is loaded into a standard recording/reproducing device as will be hereinafter described, a first unlocking member (not shown) provided in the standard recording/reproducing device is inserted through the through hole 28 into the operation hole 23a of the lock member 23, and the lock member 23 is moved rearwardly by the first unlocking member to thereby unlock the tape reels 6 and 7.

Further, the bottom wall of the lower half 4 is formed with a recess 29 extending from a rear edge of the cutout 13 to a position front of the through hole 28. Accordingly, when the tape cassette 1 in this preferred embodiment is loaded into a dedicated recording/reproducing device as will be hereinafter described, a second unlocking member (not shown) provided in the dedicated recording/reproducing device is inserted through the recess 29, and a front end surface 23c of the lock member 23 is urged rearwardly by the second unlocking member to thereby unlock the reel retainers 14 and 15.

At the front end portion of the cassette case 2 is pivotably mounted a front lid 30 for protecting a front surface of the magnetic tape 5 stretched between the front guide rollers 10a and 10b.

The front lid 30 has a pair of side wall portions 30a extending rearwardly from left and right ends of the lid 30. A pair of pivot pins 31 project inwardly from inner surfaces of the side wall portions 30a, respectively, while a pair of pin holes 32 are formed through opposite side walls of the upper half 3 so as to rotatably receive the pivot pins 31. Accordingly, the front lid 30 is vertically rotatably supported to the upper half 3 by loosely inserting the pivot pins 31 into the pin holes 32. Further, a torsion spring 33 is mounted on either of the pivot pins 31, so that the front lid 30 is normally biased by the torsion spring 33 in a closing direction of the lid 30 so as to cover the front surface of the magnetic tape 5. When the tape cassette 1 is loaded into the recording/reproducing device, the front lid 30 is opened upwardly by a lid opening mechanism (not shown) provided in the recording/reproducing device, and the magnetic tape 5 is accordingly exposed from the front lid 30.

Further, a back lid 34 for protecting a back surface of the magnetic tape 5 is provided behind the front lid 30.

The back lid 34 is comprised of a back lid body 35 for covering the back surface of the magnetic tape 5 and a top plate 37 for closing a laterally elongated recess 36 formed through the top wall of the upper half 3 at its front end which recess 36 serves as an escape space for allowing escape of the back lid body 35 when it is opened. The back lid body 35 and the top plate 37 are integrally connected with each other through a pair of connecting portions 38.

The back lid body 35 is formed at its right and left ends with a pair of pivot pins 39, while a pair of supporting members 40 project from a back surface of the front lid 30 at two positions near the right and left ends thereof. The pivot pins 39 of the back lid body 35 are pivotably supported to the supporting members 40 of the front lid 30. Accordingly, the back lid 34 is rotatably connected to the front lid 30.

Further, the top plate 37 of the back lid 34 is formed at its right and left ends with a pair of arms 45 projecting downwardly, and with a pair of engagement pins 41 projecting outwardly from the arms 45 at the lower ends thereof. On the other hand, a pair of guide walls 42 are so formed as to project upwardly at right and left front portions of the lower half 4 at two positions behind the front guide rollers 10a and 10b. The guide walls 42 are formed with a pair of cam grooves 43 having a predetermined profile for engaging the engagement pins 41 of the top plate 37 of the back lid 34. Accordingly, while the front lid 30 is being rotated to be opened or closed, the engagement pins 41 are guided along the cam grooves 43, thereby opening or closing the back lid 34 in association with the rotation of the front lid 30 and also effecting control of the attitude of the back lid 34.

Additionally, the tape cassette 1 in this preferred embodiment has a special construction such that even after the head drum and the like are inserted into the mouth section 16 upon loading of the tape cassette 1 into the recording/reproducing device to draw the magnetic tape 5 into the mouth section 16, the front lid 30 can be closed again.

That is, a pair of gaps 44 for allowing passage of the magnetic tape 5 drawn into the mouth section 16 are defined at the right and left ends of the back lid 34 in the tape cassette 1. More specifically, as mentioned previously, the arms 45 project downwardly from the right and left ends of the top plate 37 of the back lid 34, and the engagement pins 41 are formed at the lower ends of the arms 45. Thus, there is defined a predetermined gap 44 between the right arm 45 and the right end of the back lid body 35, and there is also defined a predetermined gap 44 between the left arm 45 and the left end of the back lid body 35. As the magnetic tape 5 (shown by a two-dot chain line in FIG. 7) drawn into the mouth section 16 passes through the gaps 44, the back lid 34 cooperating with the front lid 30 during the rotation thereof does not interfere with the magnetic tape 5. Therefore, the front lid 30 can be smoothly closed without any obstacles.

Further, in order to prevent interference between the magnetic tape 5 to be drawn into the mouth section 16 and the guide walls 42 of the lower half 4, the guide walls 42 are located at the positions such that their front ends are largely retracted from the front guide rollers 10a and 10b, and there is defined a desired gap between the front end of each guide wall 42 and the front lid 30 under the closed condition thereof.

Further, a pair of right and left grooves 46 are formed at the rear edge of the recess 36 of the top wall of the upper half 3, so as to allow the escape of the arms 45 of the back lid 34 upon opening of the front lid 30.

The operation of the tape cassette 1 as constructed above will now be described.

Figure 1:
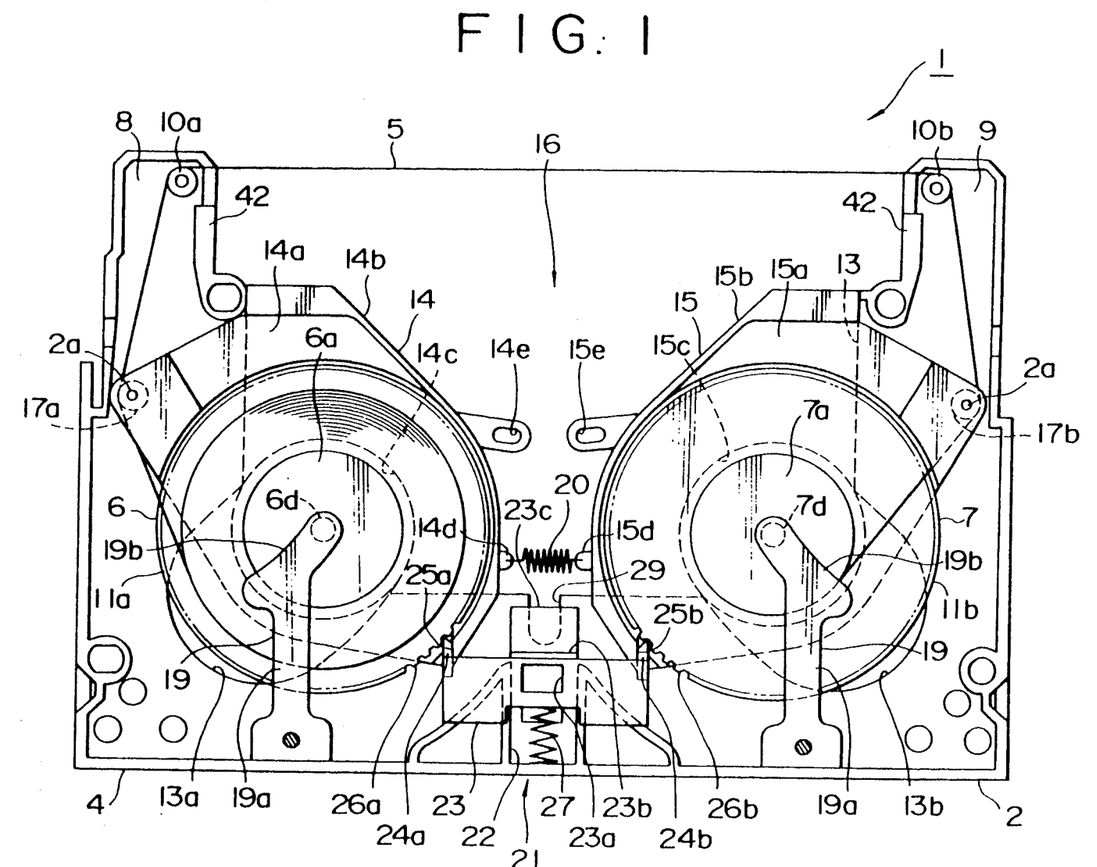
FIG. 1 is a top plan view of the tape cassette with an upper half thereof removed, showing a rotation and movement locked condition of the tape reels, according to a preferred embodiment of the present invention.
Figure 2:
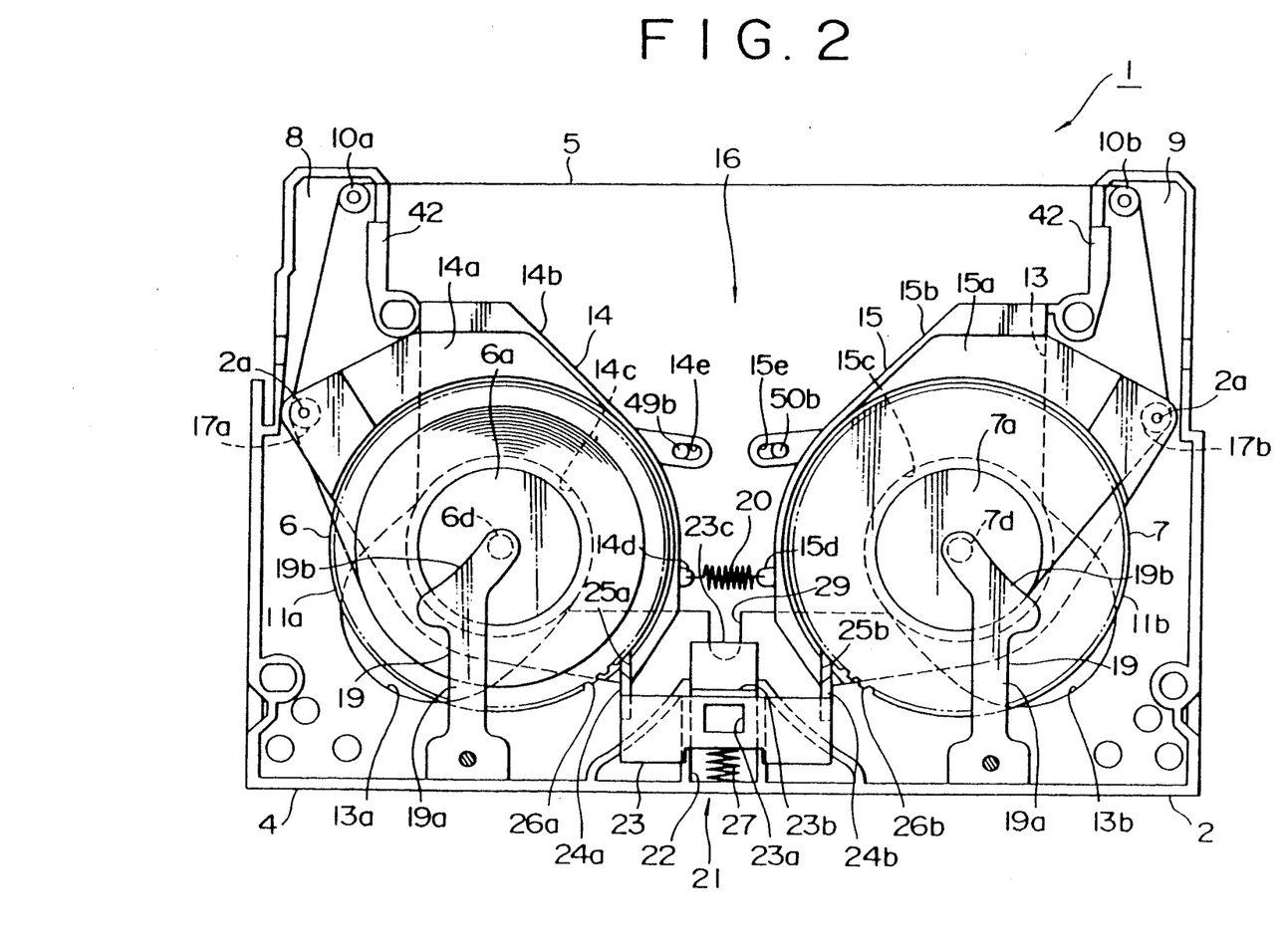
FIG. 2 is a view similar to FIG. 1, showing a rotation unlocked condition of the tape reels.
Figure 3:
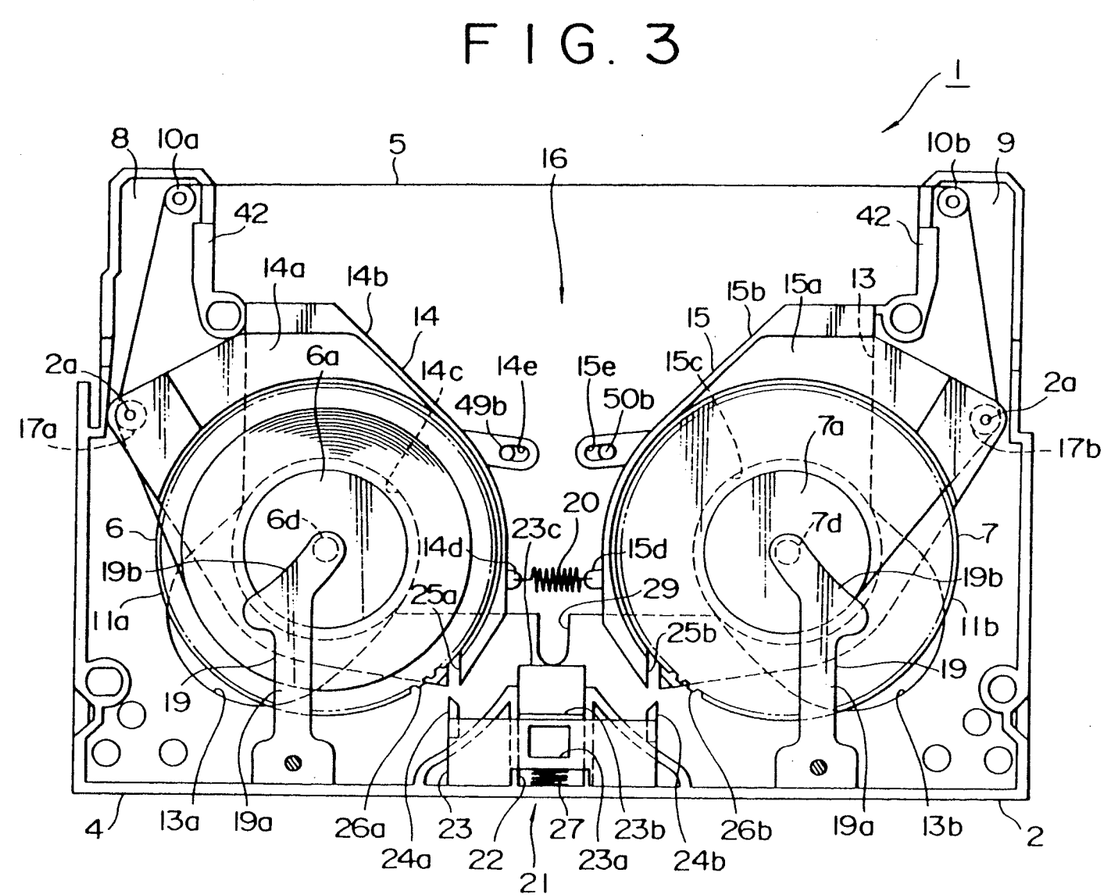
FIG. 3 is a view similar to FIG. 1, showing a movement unlocked condition of the tape reels.

Under the normal or inoperative condition of the tape cassette 1 as shown in FIG. 1, the tape reels 6 and 7 are disposed at the normal or initial position as defined by the 8 mm video standard. In this normal position of the tape reels 6 and 7, the pawls 24a and 24b of the lock member 23 are engaged with the engagement grooves 25a and 25b of the reel retainers 14 and 15, and are also engaged with the engagement teeth 26a and 26b of the tape reels 6 and 7, respectively. Accordingly, the reel retainers 14 and 15 are locked in the normal position of the tape reels 6 and 7, and the tape reels 6 and 7 are also locked to be maintained in an nonrotatable condition.

As mentioned above, the tape reels 6 and 7 are normally disposed in the normal position as defined by the 8 mm video standard. Therefore, the tape cassette 1 in this preferred embodiment can be used like a general 8 mm video cassette without especially using an adapter or the like.

In the case of loading this tape cassette 1 into a standard recording/reproducing device designed in accordance with the 8 mm video standard, the first unlocking member provided in this recording/reproducing device as mentioned previously is inserted through the through hole 28 of the lower half 4 into the operation hole 23a of the lock member 23. Then, the lock member 23 is moved rearwardly by the first unlocking member against the biasing force of the compression coil spring 27. As a result, the pawls 24a and 24b of the lock member 23 are brought into disengagement from the engagement teeth 26a and 26b of the tape reels 6 and 7. Thus, the tape reels 6 and 7 are made rotatable (see FIG. 2).

As described above, in the case of applying this tape cassette 1 to the standard recording/reproducing device, only the engaged condition of the pawls 24a and 24b of the lock member 23 with respect to the engagement teeth 26a and 26b of the tape reels 6 and 7 is released, but the engaged condition of the pawls 24a and 24b with respect to the engagement grooves 25a and 25b of the reel retainers 14 and 15 is still maintained. That is, only the rotation locked condition of the tape reels 6 and 7 is released, but the original normal position of the tape reels 6 and 7 is maintained. Accordingly, this tape cassette 1 can be operated in the standard recording/reproducing device in the same manner as a general 8 mm video cassette (i.e., this tape cassette 1 is compatible with a general 8 mm video cassette).

Now, there will be described the operation in the case of loading the tape cassette 1 into a dedicated recording/reproducing device departing from the 8 mm video standard. First, a construction of such a dedicated recording/reproducing device will be schematically described.

Referring to FIGS. 9A to 9D, reference numeral 47 generally denotes a dedicated recording/reproducing device for the tape cassette 1.

Reference numeral 48 denotes a mechanical chassis of the dedicated recording/reproducing device 47. A pair of left and right reel base chassis 49 and 50 are pivotably supported through two pivotal shafts 51 to the mechanical chassis 48. A pair of reel bases 52 and 53 are rotatably supported to the reel base chassis 49 and 50, respectively.

Figure 9A:
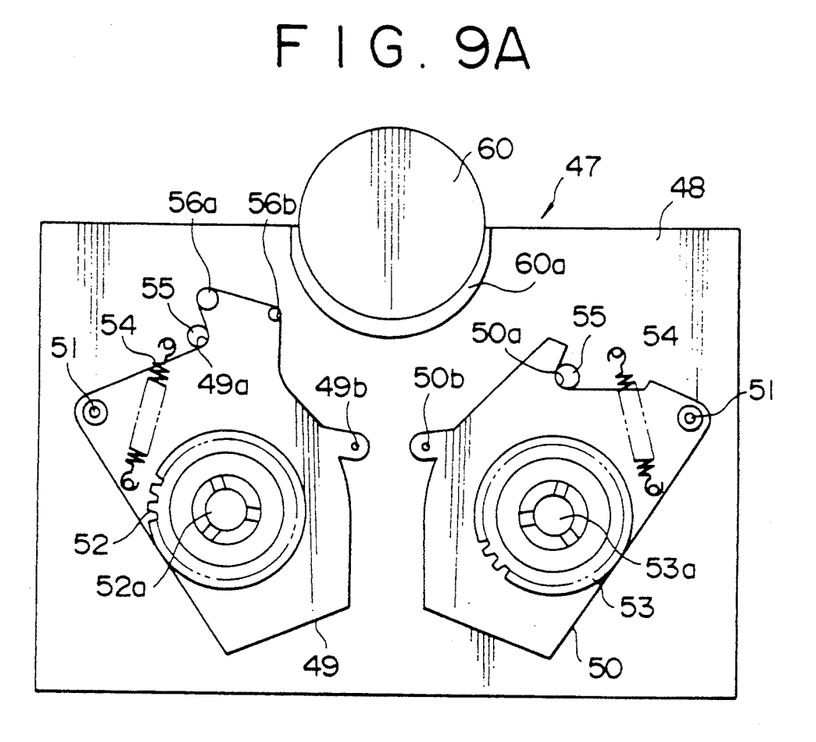
FIGS. 9A to 9D are schematic plan views of a dedicated recording/reproducing device, illustrating the operation thereof.

A pair of tension coil springs 54 are connected under tension between the mechanical chassis 48 and the left reel base chassis 49 and between the mechanical chassis 48 and the right reel base chassis 50. A tensile force of the tension coil spring 54 provides for a torque in such a direction that the reel base chassis 49 and 50 approach each other. A pair of stopper pins 55 are so provided as to project upwardly from the mechanical chassis 48. The reel base chassis 49 and 50 are formed with rear concave side edges 49a and 50a, respectively, normally abutting against the stopper pins 55 due to the tensile force of the tension coil springs 54, thereby hindering excess rotation of the reel base chassis 49 and 50. Such a position where the excess rotation of the reel base chassis 49 and 50 is inhibited by the stopper pins 55 is an initial position of the reel base chassis 49 and 50 as shown in FIG. 9A.

Two tape guide posts 56a and 56b project upwardly from the reel base chassis 49, and a pair of positioning pins 49b and 50b project upwardly from the reel base chassis 49 and 50, respectively.

Referring to FIG. 4, the mechanical chassis 49 is provided with a capstan 57 and a tape guide post 58. Further, two loading posts 59a and 59b are movably provided on the mechanical chassis 48.

Reference numeral 60 denotes a head drum having a magnetic head (not shown). The head drum 60 is disposed on a movable plate (not shown) which is movably mounted on the mechanical chassis 48. Further, an impedance roller 61, a pinch roller 62, etc. are provided on this movable plate.

Prior to loading of the tape cassette 1 into the recording/reproducing device 47, the reel base chassis 49 and 50 are kept in the initial position as shown in FIG. 9A, and the head drum 60 is kept apart from an intermediate position between the reel bases 52 and 53. In this condition shown in FIG. 9A, a spacing between the reel bases 52 and 53 is set to be equal to a spacing between the lower open holes 6b and 7b of the tape reels 6 and 7 of the tape cassette 1 in the initial position. Accordingly, when the tape cassette 1 is loaded into the recording/reproducing device 47 kept in the condition shown in FIG. 9A, a pair of reel engagement shafts 52a and 53a respectively provided on the reel bases 52 and 53 are brought into engagement with the lower open holes 6b and 7b of the tape reels 6 and 7, respectively. At the same time, the positioning pins 49b and 50b of the reel base chassis 49 and 50 are brought into engagement with the positioning holes 14e and 15e of the reel retainers 14 and 15, respectively. In this stage, a releasing member (not shown) provided in the recording/reproducing device 47 is inserted through the recess 29 of the bottom wall of the lower half 4, and is operated to urge the front end surface 23c of the lock member 23. Then, the lock member 23 is retracted with a stroke larger than that in the case of loading the tape cassette 1 into the standard recording/reproducing device as mentioned above. Accordingly, the pawls 24a and 24b of the lock member 23 are released from not only the engagement teeth 26a and 26b of the tape reels 6 and 7 but also the engagement grooves 25a and 25b of the reel retainers 14 and 15. As a result, not only the tape reels 6 and 7 but also the reel retainers 14 and 15 are brought into a rotatable condition (see FIG. 3).

When the tape cassette 1 is loaded into the recording/reproducing device 47 as mentioned above, the tape guide posts 56a, 56b and 58, the capstan 57, and the loading posts 59a and 59b are displaced into the mouth section 16 of the tape cassette 1.

Then, the movable plate having the head drum 60 and the like is moved to deeply insert the head drum 60 into the mouth section 16, thereby pivotally moving the reel base chassis 49 and 50 from the initial position to the retracted position.

Figure 9B:
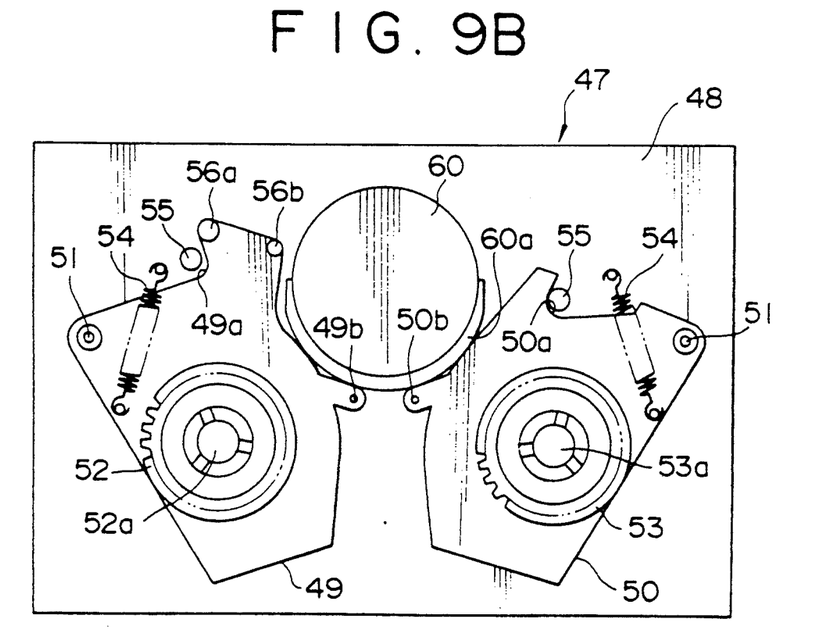
Figure 9C:
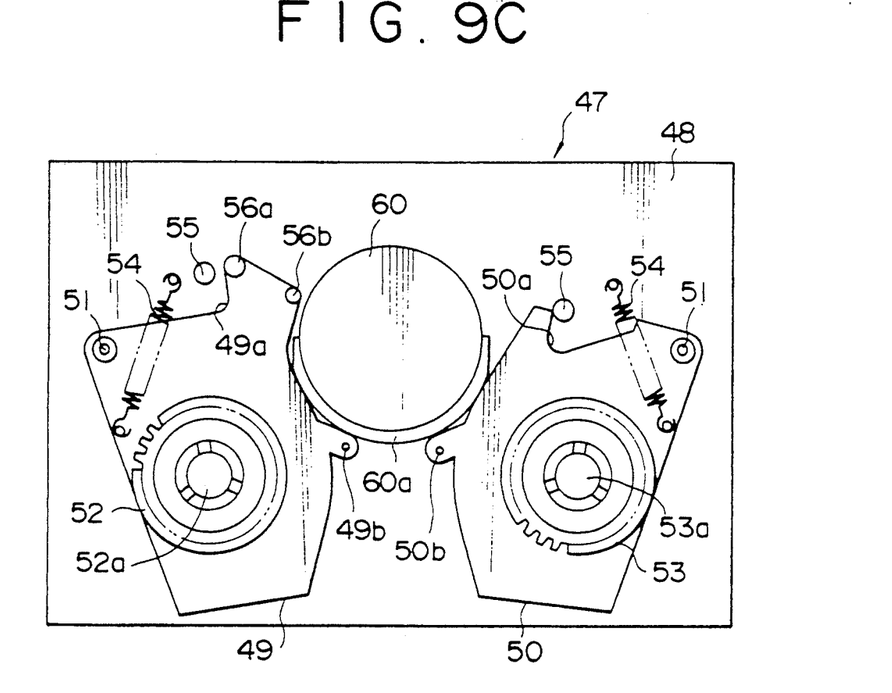
Figure 9D:
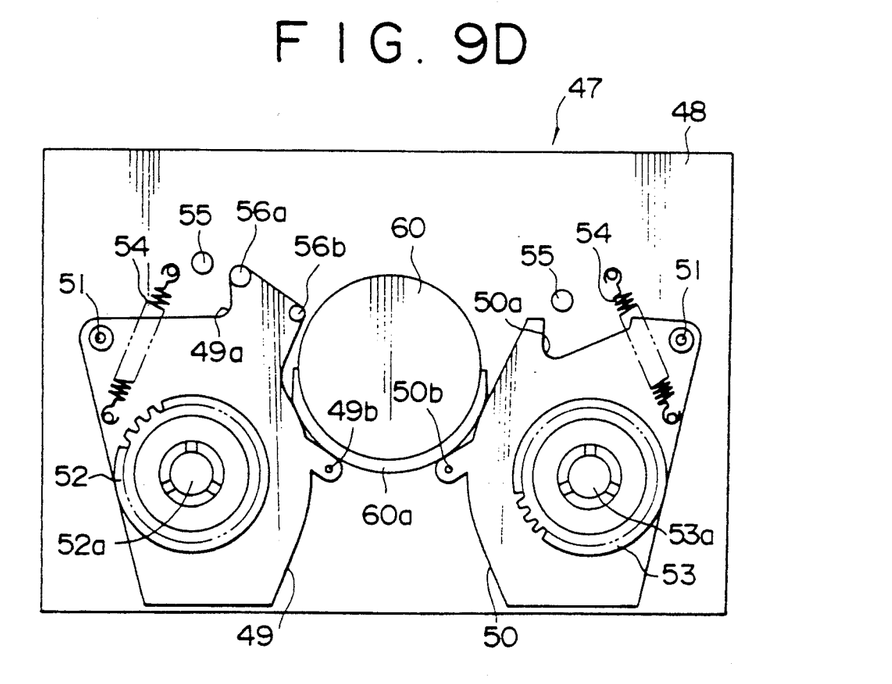

More specifically, when the head drum 60 is advanced into the mouth section 16, a head base 60a supporting the head drum 60 comes into abutment against opposed side edges 49c and 50c of the reel base chassis 49 and 50 (see FIG. 9B). When the head drum 60 is further advanced from this position, the head base 60a urges the opposed side edges 49c and 50c of the reel base chassis 49 and 50 to pivotally move the reel base chassis 49 and 50 toward the retracted position (see FIG. 9C). Finally, the reel base chassis 49 and 50 reach the retracted position (see FIG. 9D). By the pivotal movement of the reel base chassis 49 and 50 toward the retracted position, the reel retainers 14 and 15 supporting the tape reels 6 and 7 which are engaged with the reel engagement shafts 52a and 53a on the reel base chassis 49 and 50 are also pivotally moved toward the retracted position with the side edges of the positioning holes 14e and 15e of the reel retainers 14 and 15 being urged by the positioning pins 49b and 50b. During this pivotal movement of the reel retainers 14 and 15, an error in position of the reel retainers 14 and 15 in the radial direction in respect of the arc to be formed about each pivotal shaft 2a can be absorbed, while the reel retainers 14 and 15 can be accurately positioned in the rotational direction since the positioning holes 14e and 15e are elongated in the radial direction.

After the locked condition of the reel retainers 8 and 9 is released, the reel retainers 14 and 15 are swung rearwardly about the pivotal shafts 2a. In other words, the tape reels 6 and 7 retained by the reel retainers 14 and 15 are moved to the rear corner portions in the cassette case 2 as simultaneously with the swing motion of the reel retainers 14 and 15. Accordingly, the mouth section 16 is widely expanded (see FIG. 4). In this condition, the tension coil spring 20 is extended in the recess 23b of the lock member 23.

Such expansion of the mouth section 16 enables the head drum 60 and a tape running unit inclusive of the impedance roller 61, the tape guide posts 56a, 56b and 58, the loading posts 59a and 59b, the capstan 57, the pinch roller 62, etc. provided in the recording/reproducing device to be completely received into the mouth section 16 upon recording or reproducing.

A tape loading operation of the recording/reproducing device will be briefly described. The tape guide posts 56a, 56b and 58, the loading posts 59a and 59b, and the capstan 57 of the tape running unit are provided on the mechanical chassis 48 of the recording/reproducing device, and they are disposed in the mouth section 16 when the tape cassette 1 is loaded. On the other hand, the head drum 60, the impedance roller 61, and the pinch roller 62 are provided on the movable plate (not shown) which is movable relative to the mechanical chassis 48 of the recording/reproducing device, and they are disposed outside the mouth section 16 before the tape cassette 1 is fully loaded. When the tape cassette 1 is fully loaded into the recording/reproducing device, the movable plate is moved to insert the head drum 60, the impedance roller 61, and the pinch roller 62 from the front opening of the cassette case 2 into the mouth section 16. Accordingly, the magnetic tape 5 stretched between the guide rollers 10a and 10b is drawn into the mouth section 16 to form a predetermined tape path. Simultaneously, the loading posts 59a and 59b are arcuately moved around the head drum 60 to wind the magnetic tape 5 around the head drum 60, thus ending the loading operation.

The above-mentioned loading operation is carried out under the open condition of the front lid 30 (the front lid 30 is opened by the lid opening mechanism provided in the recording/reproducing device upon loading of the tape cassette 1). However, since the whole of the head drum 60 and the tape running unit is completely received in the mouth section 16 at the end of the loading operation, the front lid 30 can be closed again after ending the loading operation.

As mentioned above, the two gaps 44 for allowing passage of the magnetic tape 5 are formed at the right and left ends of the back lid 34. Therefore, the back lid 34 does not interfere with the magnetic tape 5, and the front lid 30 can be closed smoothly and reliably without any troubles.

Having thus described the present invention applied to a tape cassette compatible with a standard tape cassette specified by the 8 mm video standard by way of example, it is to be noted that the present invention is not limited to such a tape cassette but may be applied to various tape cassettes compatible with those of the recording type employing a rotary head, such as ½ inch video cassette and DAT (digital audio tape recorder) cassette which are commercially available at present.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A tape cassette comprising:
   a cassette case;
   a pair of rotatable tape reels accommodated in said cassette case for winding a magnetic tape therearound;
   a mouth section formed between and along the front of said tape reels in said cassette case for receiving a head drum and associated components of a recording/reproducing device;
   means for allowing pivotal movement of said tape reels to rear corner portions of said cassette, whereby when said tape cassette is loaded into a recording/reproducing device, said tape reels are pivotally moved from an initial position to a retracted position defined at the rear corner portions of said cassette case, thereby expanding said mouth section; and
   a pair of reel retainers pivotably supported in said cassette case for rotatably supporting said tape reels, respectively, each of said reel retainers having a bottom wall formed with a positioning hole adapted to engage a positioning member provided in said recording/reproducing device.

2. The tape cassette as defined in claim 1 further comprising means for normally biasing said reel retainers so as to restore said initial position.

3. The tape cassette as defined in claim 2, wherein said biasing force is connected between said reel retainers.

4. The tape cassette as defined in claim 1, wherein said positioning hole is elongated in a radial direction formed about a fulcrum of pivotal movement of each of said reel retainers.

* * * * *